US010375652B2

(12) United States Patent
Shakya et al.

(10) Patent No.: US 10,375,652 B2
(45) Date of Patent: Aug. 6, 2019

(54) TRANSMISSION POWER CONTROL FOR WIRELESS COMMUNICATION DEVICES

(71) Applicant: Itron Global SARL, Liberty Lake, WA (US)

(72) Inventors: Nikesh Man Shakya, Evry (FR); Mehdi Mani, Paris (FR)

(73) Assignee: ITRON GLOBAL SARL, Liberty Lake, WA (US)

( * ) Notice: Subject to any disclaimer, the term of this patent is extended or adjusted under 35 U.S.C. 154(b) by 0 days.

(21) Appl. No.: 15/846,384

(22) Filed: Dec. 19, 2017

(65) Prior Publication Data
US 2019/0191387 A1    Jun. 20, 2019

(51) Int. Cl.
*H04W 52/24* (2009.01)
*H04W 52/36* (2009.01)

(52) U.S. Cl.
CPC ....... *H04W 52/245* (2013.01); *H04W 52/241* (2013.01); *H04W 52/367* (2013.01)

(58) Field of Classification Search
CPC ............ H04W 52/242; H04W 52/245; H04W 72/0473; H04W 52/08; H04W 52/367; H04W 52/143; H04W 52/04; H04W 52/248
See application file for complete search history.

(56) References Cited

U.S. PATENT DOCUMENTS

| 2009/0168677 A1* | 7/2009 | Kang | H04W 52/08 370/311 |
| 2012/0083289 A1* | 4/2012 | Li | H04W 64/00 455/456.1 |
| 2012/0225687 A1* | 9/2012 | Norair | H04L 1/0061 455/522 |

OTHER PUBLICATIONS

Kim, et al., "ODTPC: On-demand Transmission Power Control for Wireless Sensor Networks," International Conference on Information Networking, ICOIN 2008, Jan. 23-25, 2008, Busan, South Korea, 5 pages.

(Continued)

Primary Examiner — Keith Ferguson

(57) ABSTRACT

A device and method for controlling transmission power in a network device is disclosed. The method comprises transmitting, at an initial transmission power, an initial data transmission intended for at least one receiving device on a network, receiving an initial response from the at least one receiving device, the initial response including an initial received signal strength indication (RSSI), determining a power loss based on the value of the initial transmission power and the received RSSI, determining a new transmission power based on the determined power loss, and transmitting, at the new transmission power, one or more additional data transmissions intended for the at least one receiving device. The method further comprises determining whether link quality is deteriorating, and applying additional measures for optimizing transmission power based on the link quality and other factors. A solution for mitigating a loop condition is also disclosed.

19 Claims, 16 Drawing Sheets

(56) References Cited

OTHER PUBLICATIONS

Lin, et al., "ATPC: Adaptive Transmission Power Control for Wireless Sensor Networks," Proceedings of the 4th International Conference on Embedded Networked Sensor Systems, SenSys 2006, Nov. 1-3, 2006, Boulder, Colorado, 14 pages.

Son, et al., "Experimental study of the effects of Transmission Power Control and Blacklisting in Wireless Sensor Networks," 1st Annual IEEE Comm. Soc. Conf. on Sens. and Ad Hoc Comm. and Net., IEEE SECON 2004, Oct. 4-7, 2004, Santa Clara, Calif., 10 pgs.

\* cited by examiner

TRANSMISSION POWER CONTROL FOR WIRELESS COMMUNICATION DEVICES

FIELD OF THE DISCLOSURE

This disclosure relates generally to wireless communications, and more particularly to the minimization of power consumption in communication devices.

BACKGROUND

Minimizing power consumption is a significant concern when conducting wireless communications, especially with battery-powered devices (e.g., wireless network devices (e.g., radio frequency (RF) devices), Internet-of-Things (IoT) or Wireless Sensor Network (WSN) devices, etc.). Among various sources of energy consumption, a wireless node's RF transmission is a dominant one. In current communication systems, transmissions are typically sent at a constant power level, and usually a maximum power level. In a wireless network, the distances that a receiving node is away from transmitting nodes when the transmitting nodes transmit data at the same constant transmission power will affect the receive signal strengths at the receiving node for each transmission. An example of this is shown in FIG. 1.

FIG. 1 depicts an example wireless network 100. In FIG. 1, network 100 includes a receiving wireless node 102 (denoted in white) that may receive transmissions from one or more transmitting wireless devices (nodes) (denoted in black) that are at various distances away from receiving node 102, where the transmitting is at a constant transmission power. For purposes of illustration, these distances are denoted by zones A-E, where zone A is at a nearest distance to receiving node 102 and zone E is at a farthest distance from receiving node 102. The zones A-E each represent not only a distance from receiving node 102, but also a receive (RX) signal strength at receiving node 102 when receiving a transmission from a transmitting node in that zone. As can be seen from legend 103, receive signal strengths at receiving node 102 from transmissions of transmitting nodes in zone A are the highest, and the signal strengths weaken progressively the further away the transmitting nodes are from the receiving node. For example, a receive signal strength at receiving node 102 of transmissions from transmitting node 104 in zone B at a distance 108 from receiving node 102 is stronger than a receive signal strength of transmissions from transmitting node 106 in zone E at a farther distance 110 from receiving node 102.

While transmissions at a constant high power may ensure good connectivity and reliability, it may cause increased interference, decreased channel re-use, and a decreased overall lifetime of the battery (if battery-powered). Transmissions at a consistent low power may benefit from higher channel re-use and lower interference, but may result in weak connections and unreliable links, while still consuming high amounts of energy due to losses. Thus, generally, use of constant power for transmissions may lead to inefficient use of energy. In addition, use of constant transmission power may contribute to other communication issues, such as, for example, a near-far problem (where a receiving node may not receive a transmission (or may receive a very weak transmission) from a farther transmitting node when another transmission is transmitted from a nearer transmitting node at the same time and at the same power), an overhearing problem (where a node "hears" or receives transmissions that are not intended for it, which causes unnecessary expenditure of battery energy (if battery-powered) and causes channel bandwidth to not be used to its fullest potential), and/or other problems known by those familiar with this technology.

Current solutions to these issues exist but have their downsides. One approach uses a local mean average (LMA) and mean of neighbor (LMN). This is a node level approach that uses the number of neighbor nodes as a metric. However, the initial phase, or setup, for this approach includes overhead which repeats (wasting energy), and the approach does not consider link quality. Another approach involves power control with black listing (PCBL). This approach is a packet level approach that uses packet reception rate (PRR) as a link quality metric. However, its initial beaconing phase includes overhead, and the PRR is a higher layer metric that takes time to build. A further approach is adaptive transmission power control (ATPC). This approach is also a packet level approach, but it takes spatio-temporal impacts into account and uses received signal strength (RSSI) as a link quality metric. However, this approach also has an initial beaconing phase with energy-wasting overhead and uses complex predictive models and matrix calculations. It also uses a predefined static threshold on the signal strength, which makes the algorithm less versatile in differing environmental conditions. Another approach is on-demand transmission power control (ODTPC), which is also a packet level approach. While it has a short initial phase without overhead, it uses a predefined static threshold on signal strength. Further, both the ATPC and ODTPC approaches use RSSI as a link quality indicator, but RSSI used in this way is not considered very robust, as its values are affected by noise, interference, and/or fading. Furthermore, RSSI and/or PRR used as link quality indicators do not take into account media access control (MAC) layer re-transmissions.

Figure 1:
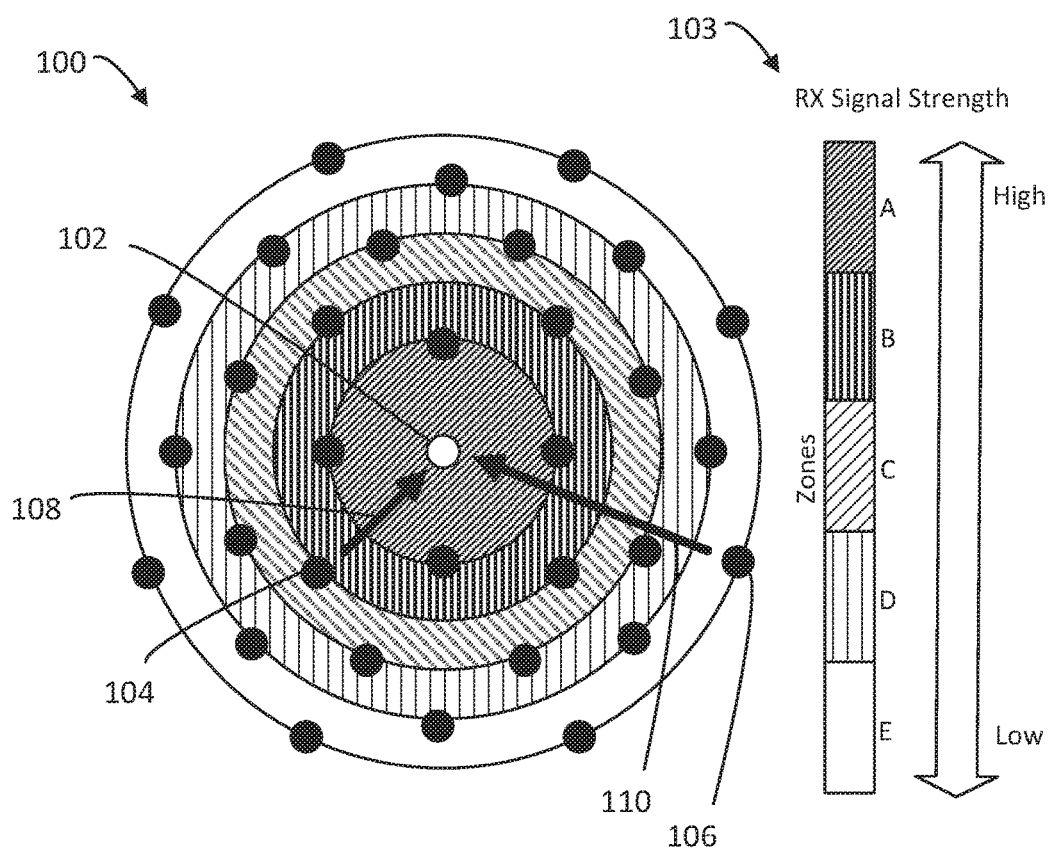
FIG. 1 is diagram showing relationship of signal strength to distance from a particular network node.

In the drawings, the leftmost digit(s) of a reference number may identify the drawing in which the reference number first appears.

DETAILED DESCRIPTION

The description herein discloses wireless transmission power control techniques that may be used to dynamically optimize use of power for wireless transmissions while avoiding the downsides of the energy-saving approaches currently used. The technology described herein provides efficient use of a battery (if used) and improved battery (and network) lifetime while maximally providing nearer node gain, mitigating the near-far problem, and promoting lower interference and higher channel re-use. As described in more detail below, transmission power may be adjusted dynamically to an optimized level with acceptable reliability and can adapt the transmission power level to changes in communication link conditions.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that the technology disclosed herein can also be employed in a variety of other systems and applications other than what is described herein.

Figure 2:
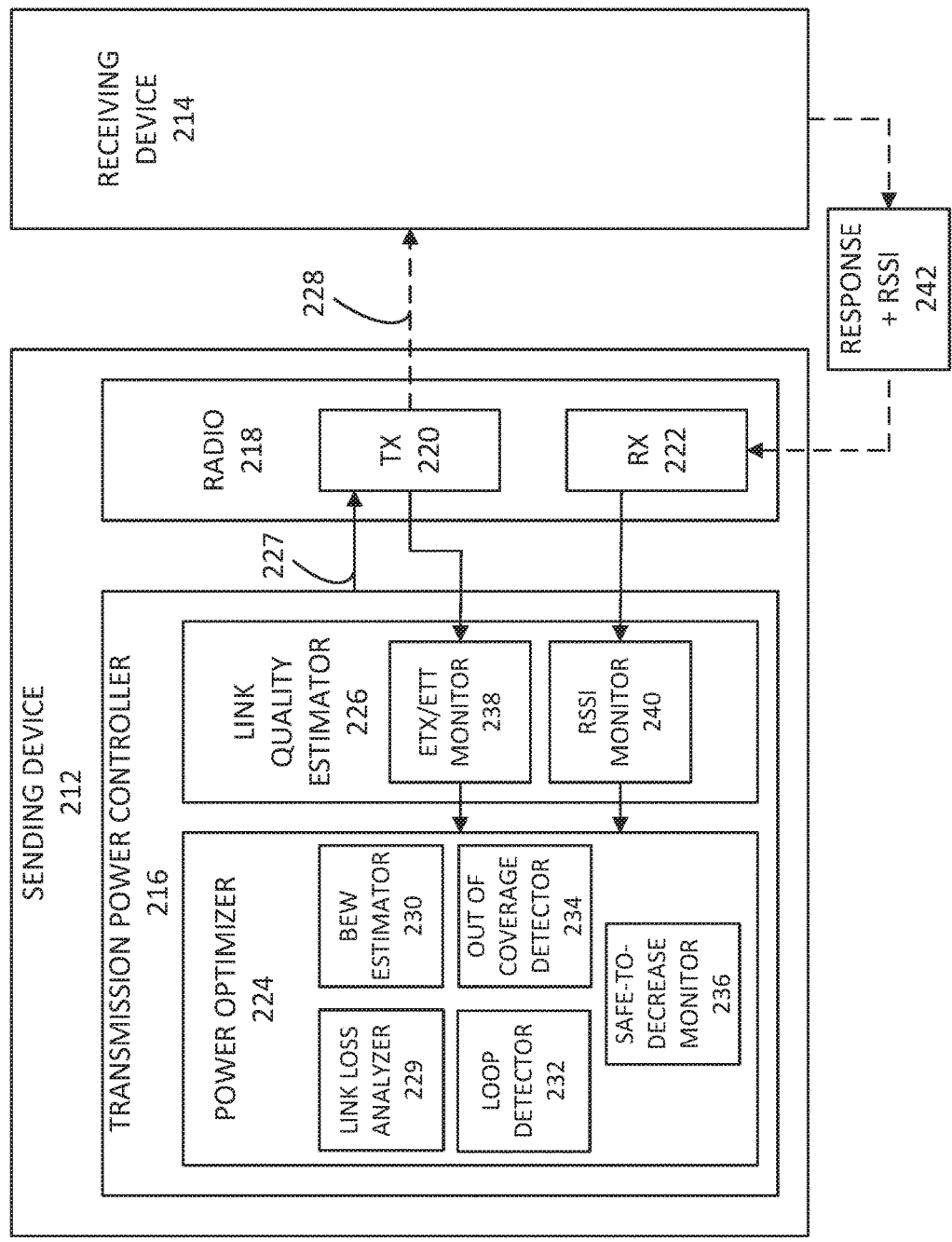
FIG. 2 is a block diagram of a network node with transmission power control, according to embodiments of the present disclosure.

FIG. 2 is a block diagram of a network node (sending device 212) with transmission power control for communicating wirelessly with another network node (e.g., receiving device 214), according to embodiments of the present disclosure. Sending device 212 and receiving device 214 may be any devices or sensors (e.g., utility meters, IoT sensors or devices, etc.) capable of communication on a network. Sending device 212 may include a transmission power controller 216 and a radio 218 comprising a transmitter 220 and a receiver 222 (or collectively, a transceiver). Transmission power controller 216 may include a power optimizer 224 and a link quality estimator 226 that, together, may determine an optimized transmission power to be communicated (arrow 227) to radio 218 for transmitting a communication 228 to receiving device 214. Power optimizer 224 may include a link loss analyzer 229, a binary exponential window (BEW) estimator 230, a loop detector 232, an out of coverage detector 234, and a safe-to-decrease monitor 236, all of which will be described in more detail below. Link quality estimator 226 may include an expected transmission count/expected transmission time (ETX/ETT) monitor 238 and an RSSI monitor 240. Upon transmission of a communication 228 by transmitter 220 to receiving device 214, transmitter 220 may provide a transmission count to ETX/ETT monitor 238, which may then provide ETX/ETT information to power optimizer 224. Receiving device 214 may send a response 242, with an RSSI, to sending device 212 (via receiver 222) upon receiving communication 228. Receiver 222 may provide RSSI 242 to RSSI monitor 240, which may then provide RSSI information to power optimizer 224.

In an embodiment, the transmission power optimization described herein may use ETX and/or ETT as a primary metric for indicating link quality, with RSSI used as a secondary metric. ETX (Expected Transmission Count) may be defined as the number of MAC layer transmissions required in order to execute a successful transmission of a packet. ETT is bandwidth adjusted ETX that takes into account different data rates and packet size (e.g., ETT=ETX*(packet size/data rate)). ETX and/or ETT may represent the actual capability of a channel to deliver a packet. Using ETX/ETT provides the advantages of using packet reception rate (PRR) but with a reduced response time. Unlike using PRR or other metrics, using ETX/ETT can take into account collisions that may occur and/or re-transmissions performed. ETX/ETT is a software-based metric, so there are no hardware dependencies unlike other link quality metrics (e.g., RSSI or LQI (link quality indication). In other embodiments, RSSI may be used as a primary metric with ETX/ETT used as a secondary metric.

Power optimizer 224 and its components may use the feedback it receives through link quality estimator 226 (e.g., ETX/ETT and RSSI feedback information) to control the transmission power used by radio 218 for upcoming transmissions 227. Link loss analyzer 229 may use the RSSI information to keep track of losses in the communication link. In an embodiment, the tracked loss in the link may be averaged and used by one or more other components of power optimizer 224. For example, before decreasing the power level used for transmissions, safe-to-decrease monitor 236 may check to ensure that it is sensible to do so (i.e., will not compromise communications (e.g., cause risk of the receiving device to become out of coverage of the sending device, risk of lost packets, risk of an oscillation condition, etc.)). By using the current transmission power level and the averaged loss, a prediction of the received power at the next lower transmission power may be made by safe-to-decrease monitor 236. If the predicted received power is not greater than a sensitivity (known or predetermined) of the receiving device (e.g., a minimum signal strength required at the receiving device for successful decoding), or is not greater than a stored RSSI (if present) of the receiving device at the next lower transmission power level, safe-to-decrease monitor 236 may direct power optimizer 224 not to decrease the power level. In an embodiment, the safe-to-decrease monitor 236 may instead direct power optimizer 224 to increase a binary exponential window (BEW) size (e.g., a transmission window including a predetermined number of transmissions) via the BEW estimator 230 in order to remain in the last stable state for a longer period of time. In an embodiment, BEW estimator 230 may provide a variable sized transmission window (i.e., a BEW) that uses a learning algorithm to help stabilize a selected transmission power level.

Loop detector 232 may detect back and forth oscillation between adjacent power levels that may occur during a stable condition. For example, at each power level, the last stable power level is stored. In an example where the current power level is level 10, after the window expires, the power level may be decreased to level 9. In this example, the last stable power level is 10. If the link quality degrades, the power level may be increased back to level 10. When increasing the power level, if the new power level (10) is same as the last stable power level (10), this is determined to be a loop. (In an embodiment, this loop test is performed only when increasing the power level but not when decreasing.) When such oscillation is detected, loop detector 232 may direct BEW estimator 230 to increase the window size (e.g., increase the predetermined number of transmissions) to alleviate the oscillation (e.g., so that it will wait for a longer period before reducing the power level again). Out of coverage detector 234 may help determine if, when decreasing the transmission power level, the receiving device is out of coverage. When the transmission power level is decreased, if there is no confirmable reception at the receiving device (i.e., if there is no response received after the expiration of a successive predetermined number of window sizes (e.g., a successive predetermined number of transmission set sizes)), the receiving device may be considered out of coverage. In an embodiment, when such an out-of-coverage condition is detected, the transmission power level may not be reduced until and unless a predetermined maximum window size (e.g., a maximum transmission set size) is reached. In an embodiment, the transmission power may be set to remain at its previous level (or higher, if warranted) instead of the decreased level for a predetermined number of transmission windows before the transmission power is decreased again. How the power optimizer 224 uses these components to optimize transmission power will be discussed in more detail below.

Figure 3:
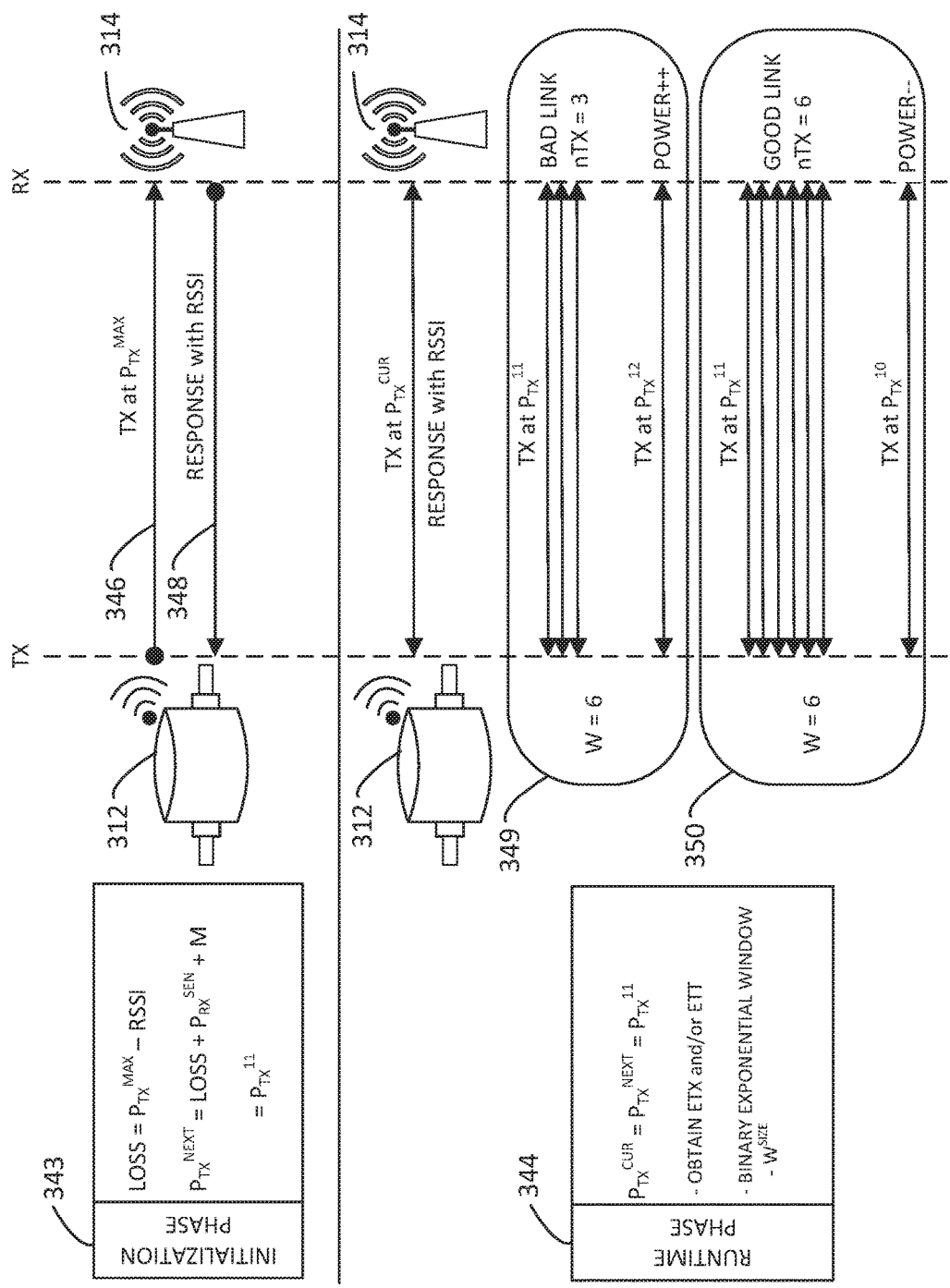
FIG. 3 is a diagram showing phases of transmission control, according to embodiments of the present disclosure.

FIG. 3 illustrates an example initialization phase 343 and an example runtime phase 344 of transmission control, according to embodiments of the present disclosure. Initialization phase 343 may be triggered at a node 312 once node 312 is booted. When node 312 is turned on, it is unaware of the current link condition or radio environment. Therefore, node 312 may send a data transmission 346 at a maximum transmission (TX) power ($P_{TX}^{MAX}$). A receiving device 314 of data transmission 346 may obtain RSSI information and send an response 348 back to node 312 with the RSSI information. Node 312 may receive the response 348 and may use the included RSSI information to analyze transmission 346 via a transmission power controller, such as transmission power controller 216 of FIG. 2. For example, a path loss model may be used by link loss analyzer 229 to perform a loss analysis, where:

$$LOSS = P_{TX}^{MAX} - RSSI \qquad \text{Eqn. 1.}$$

The next TX power to be used for the next data transmission may then be optimized as:

$$P_{TX}^{NEXT} = LOSS + P_{RX}^{SEN} + M \qquad \text{Eqn. 2,}$$

where $P_{RX}^{SEN}$ is a known receiver sensitivity value of the receiving device and M is a predetermined margin.

In runtime phase 344, the next transmission packet may be sent using transmission power $P_{TX}^{NEXT}$, and a stepwise control technique may be used to continue TX power optimization. In an example embodiment, for each transmission, one or more ETX/ETT values may be determined or obtained (e.g., in a way that would be known by one of ordinary skill in the relevant art) and used to determine link quality via ETX/ETT monitor 238. One example technique for determining link quality using ETX/ETT is using an exponential weighted mean average, which would be more accurate than using an individual ETX/ETT value alone. For example, using an exponential weighted mean average:

$$ETX = \alpha ETX_{OLD} + (1-\alpha) ETX_{NEW} \qquad \text{Eqn. 3,}$$

where $ETX_{OLD}$ is the previously calculated ETX value, $ETX_{NEW}$ is the newly obtained ETX value, and $\alpha$ is a predetermined weighing factor that may be adjusted for more accurate link quality estimations. While link quality using ETX estimates is discussed here, other methods to determine link quality may be used.

In an embodiment, a link quality estimate may be used in conjunction with a stabilization mechanism, such as, for example, a binary exponential windowing mechanism, where a variable window size (e.g., a predetermined number of transmissions) is used along with a learning algorithm as a way to stabilize optimal transmission power. In an example, transmissions may be sent by node 312 at a same transmission power until the predetermined window period expires. If the link quality is determined to be deteriorating (e.g., when the calculated ETX (see Eqn. 3) increases beyond a predetermined threshold), the transmission power may be increased (e.g., by a predetermined amount). In an embodiment, this increase in transmission power may be done even if the window period has not yet expired. As illustrated in example 349 of FIG. 3, for a window size of six (6) transmissions, when link quality is shown to be deteriorating (at, or by, transmission 3 in the example, the next transmission(s) are sent at an increased power (e.g., increased by a predetermined amount). If the link quality is instead determined to be acceptable throughout the window period (e.g., all six transmissions, as shown in example 350), the transmission power may be decreased for the next transmission(s) (e.g., by a predetermined amount) as a way of conserving energy. While a binary exponential windowing mechanism is described herein, other stabilization mechanisms may be used.

Figure 4:
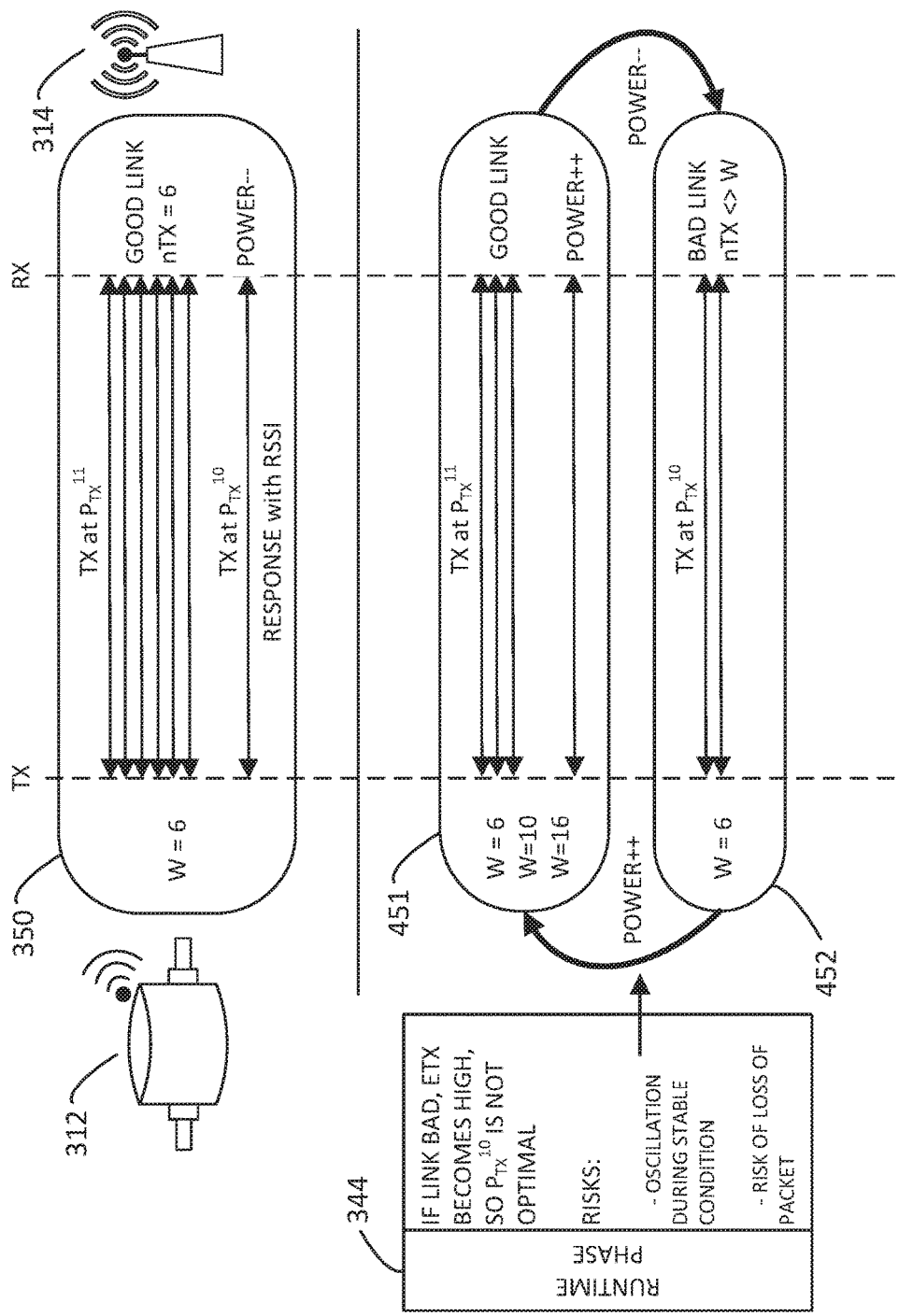
FIG. 4 illustrates a possible loop condition that may develop when controlling transmission power.

When the transmission power is decreased (e.g., as in example 350), there are at least two possible scenarios to consider. If the link quality remains acceptable, transmissions may continue to follow the above-described process. If, however, the link quality deteriorates (e.g., per the link quality checks described above), the transmission power may be increased. In this scenario, it is possible that a loop condition may occur during a stable condition, continually alternating between decreasing and increasing transmission power based on determined link quality. This oscillation during a stable condition may result in loss of packets, especially at the end of a transmission window period. This loop condition may be detected by loop detector 232 (FIG. 2). One example way to handle a detected loop condition is to increase the transmission window size (e.g., via BEW estimator 230) so that transmission power will stay in its last stable state for a longer time (i.e., for more transmissions). By doing so, there is improved control over how long a node will stay at a particular transmission power level, and also, with an increase in transmission window size, there will be an increased number of samples from which to average ETX/ETT for better link quality estimation, etc. This is shown in FIG. 4, where link quality is determined to be acceptable at power level 11 ($P_{TX}^{11}$) in example 451 with a window size of six (6) transmissions, the transmission power is decreased (to power level 10 ($P_{TX}^{10}$)) and transmissions are sent according to example 452, but link quality is then determined to be deteriorating at $P_{TX}^{10}$, so the transmission power is then increased again according to example 451 with an increased window size of ten (10) transmissions, etc. One goal of increasing the window size is to stay at an optimized transmission power level as long as possible once an optimized transmission power level is found.

While increasing the transmission window size is beneficial, there may still be risk of oscillation between transmission power levels and/or risk of packet loss when transmission power is reduced. One way to further minimize these risks is to conduct a further check to ensure that it is safe to decrease the transmission power level before doing so (e.g., little to no risk of oscillation, lost packets, an out of coverage condition, etc.). An example way of conducting this check is to use the RSSI metric that is returned with each response from a receiving device to a sending device. An example of how this may be done follows. At each transmission power level, transmission power controller 216 may keep track of $LOSS_{AVG}$ via link loss analyzer 229 using the current TX power level and the obtained RSSI. Whenever the transmission power level is to be increased, an $RSSI_{AVG}$ at the last unstable power level (e.g., the most recent unstable lower power level), an estimated RX power at receiving device 214, and a next TX power to be used at sending device 212 may be determined/tracked by safe-to-decrease monitor 236 using $LOSS_{AVG}$. At the end of each transmission window period, before decreasing the transmission power level, a safety check may be conducted via safe-to-decrease monitor 236 as shown in FIG. 5.

Figure 5:
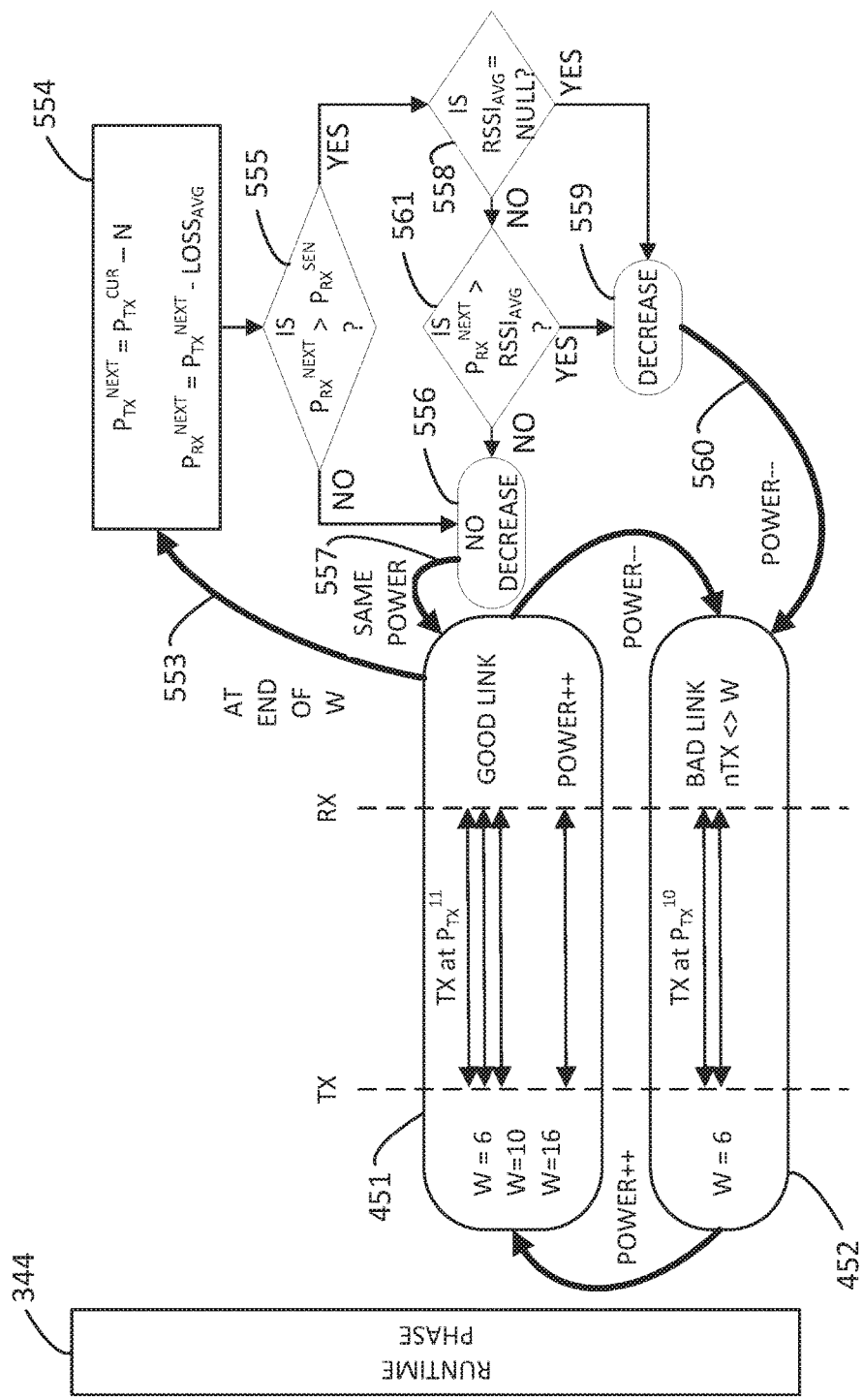
FIG. 5 is a combination block and flow diagram illustrating a method of mitigating a loop condition, according to embodiments of the present disclosure.

In FIG. 5, according to transmission example 451, link quality remains acceptable through the end of the predetermined window period (e.g., six (6) transmissions in the example shown). At the end of the window period, and prior to reducing the transmission power, the safety check commences (following arrow 553). At 554, the next transmission power ($P_{TX}^{NEXT}$)) may be determined to be $P_{TX}^{CUR}$ minus a predetermined amount N, and the expected receive power at receiving device 214 ($P_{RX}^{NEXT}$) may be determined to be $P_{TX}^{NEXT}$ minus $LOSS_{AVG}$. In an embodiment, in order to be considered safe to reduce the transmission power level, $P_{RX}^{NEXT}$ should be greater than the receiver sensitivity $P_{RX}^{SEN}$ and greater than the $RSSI_{AVG}$ recorded for the last unstable transmission power level (if available). Thus, at 555, it may be determined whether $P_{RX}^{NEXT}$ is greater than the receiver sensitivity $P_{RX}^{SEN}$. If not, then at 556, transmission power is not decreased and the transmission power level may remain the same for the next transmission(s) (following arrow 557), with the transmission window size increased if necessary (according to the above-described determination(s) for increasing transmission window size). If it is determined that $P_{RX}^{NEXT}$ is greater than receiver sensitivity $P_{RX}^{SEN}$, then, according to an embodiment, at 558 it may be determined whether the $RSSI_{AVG}$ value is NULL (e.g., 0xFF). If $RSSI_{AVG}$ is NULL, then at 559, transmission power is decreased for the next transmission(s) (following arrow 560). If $RSSI_{AVG}$ is other than NULL, then at 561, it may be determined whether $P_{RX}^{NEXT}$ is greater than $RSSI_{AVG}$. If $P_{RX}^{NEXT}$ is greater than $RSSI_{AVG}$, then at 559, transmission power is decreased for the next transmission(s) (following arrow 560). If $P_{RX}^{NEXT}$ is not greater than $RSSI_{AVG}$, then at 556, the transmission power level may remain the same for the next transmission(s) (following arrow 557), with the transmission window size increased if necessary (according to the above-described determination(s)). In an embodiment, when the transmission power level is decreased, the transmission window size may be reset to its initial setting (e.g., a window size of 6 in the examples shown in the figures).

In an embodiment, one or more averaging techniques (e.g., for ETX/ETT, RSSI, and/or LOSS averages) may be reset or recalculated when a transmission power level is changed. This is because with a change in transmission power level, there may be a change in the link condition/quality, so the averaging of the metrics may need to be reset (e.g., started over).

In summary of the above-described example(s), transmission power controller 216 may use an intelligent control mechanism that uses an ETX/ETT metric as a primary metric to determine link quality, and may use an RSSI metric from the receiver side (e.g., obtained via a feedback mechanism) as an auxiliary metric in order to safeguard a decision to decrease transmission power, in order to provide an optimal transmission power value that is stable and to better ensure a reliable and energy efficient communication. This transmission power control mechanism does not use static thresholds on the signal levels, and as a result, it provides more versatility to differing environmental conditions (e.g., indoor areas, outdoor areas, parking areas, grassy areas, etc. for which different thresholds may be applicable). This mechanism also uses an initial phase with almost no overhead as it works on a single data/response exchange.

FIGS. 6-13 are flow diagrams of one or more example transmission control processes, according to embodiments of the present disclosure. These flowcharts may summarize one or more of the embodiments discussed above.

Figure 6:
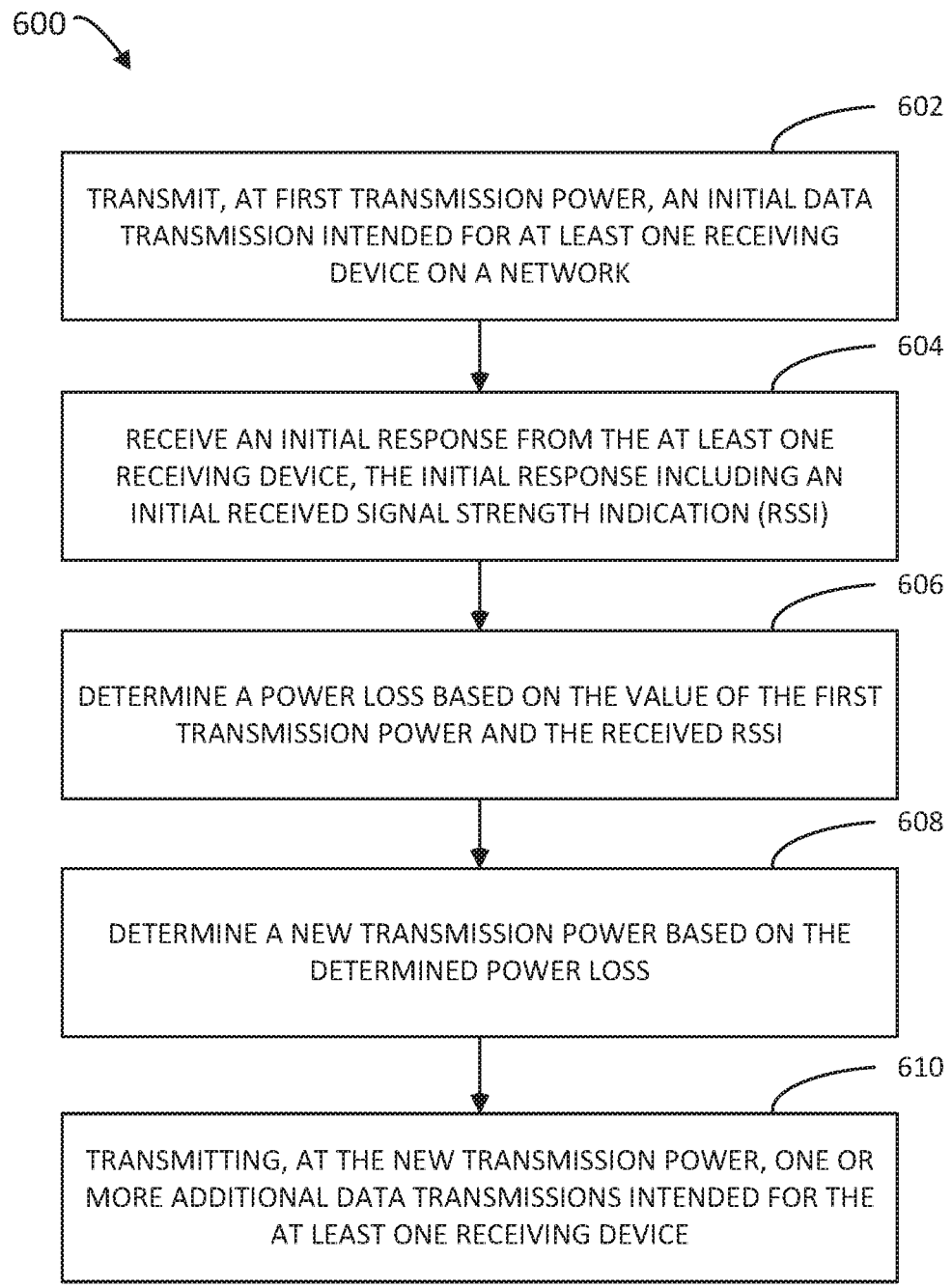
FIGS. 6-13 are flow diagrams of one or more example transmission control processes, according to embodiments of the present disclosure.

In FIG. 6, process 600 describes an initialization phase where an initial transmission is sent at an initial transmission power and a next transmission power is determined based on the outcome of the initial transmission. At 602, an initial data transmission intended for at least one receiving device (e.g., device 214, 314) of a network may be transmitted from a transmitting device (e.g., device 212, 312) at an initial transmission power. In an embodiment, the initial transmission power may be a predetermined maximum transmission power. At 604, an initial response may be received by the transmitting device from the at least one receiving device, where the response includes an initial received signal strength indication (RSSI). At 606, a power loss may be determined (e.g., by link loss analyzer 229) based on the value of the initial transmission power and the received RSSI. At 608, a new transmission power may be determined based on the determined power loss. The new transmission power may further be based on a power sensitivity factor (e.g., a known sensitivity of the receiving device), and a predetermined margin. At 610, one or more additional data transmissions intended for the at least one receiving device may be transmitted at the new transmission power.

Figure 7:
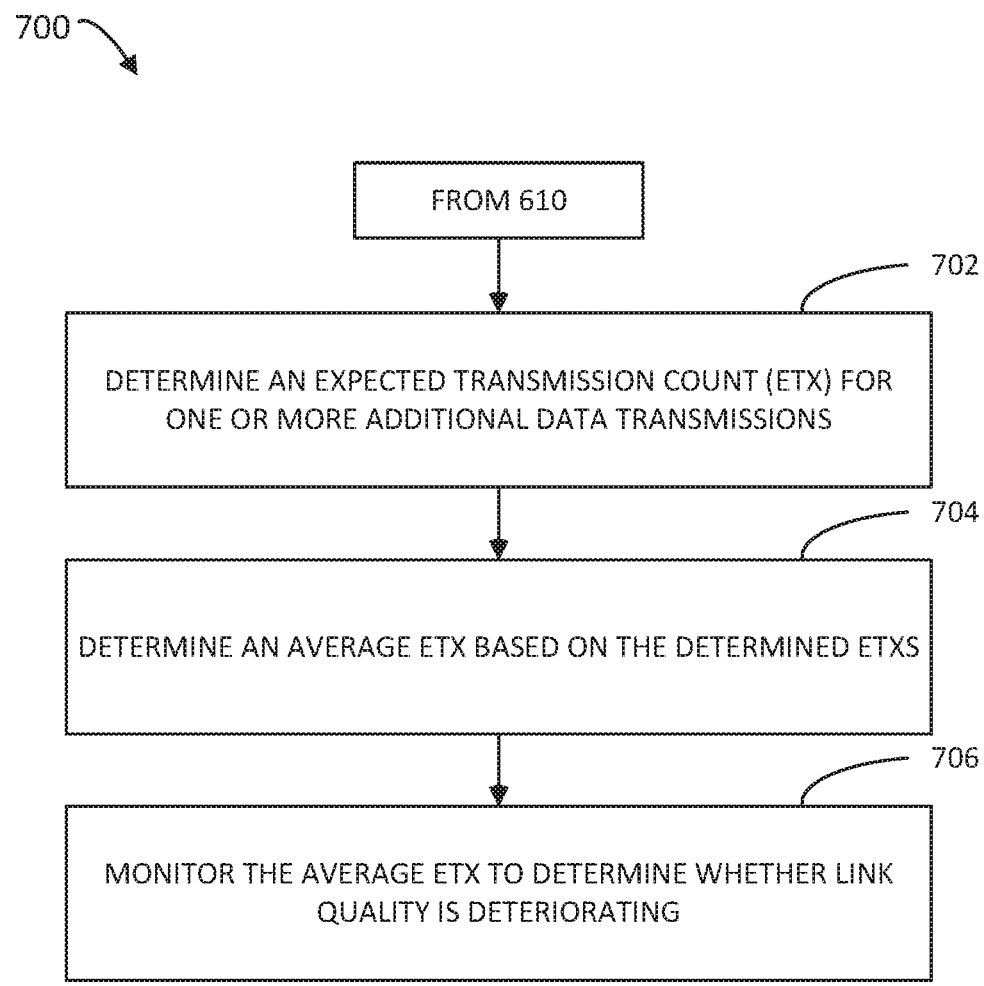
Figure 8:
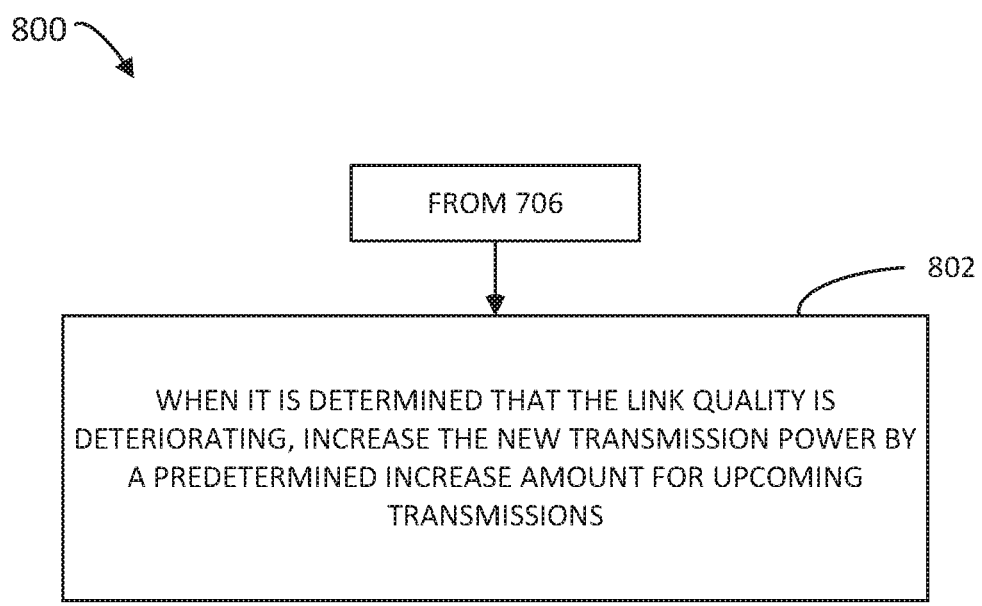
Figure 9:
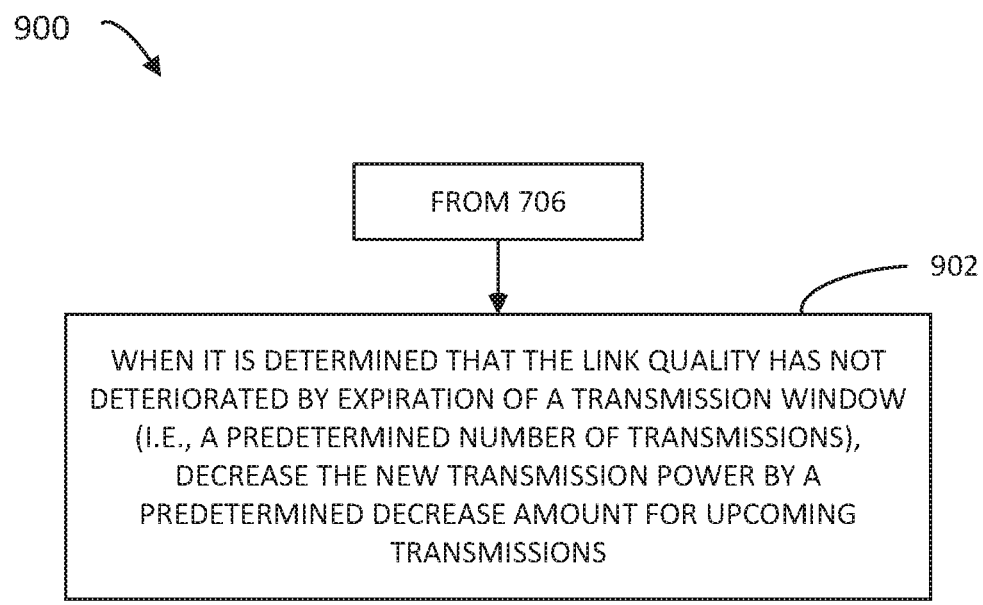
Figure 10:
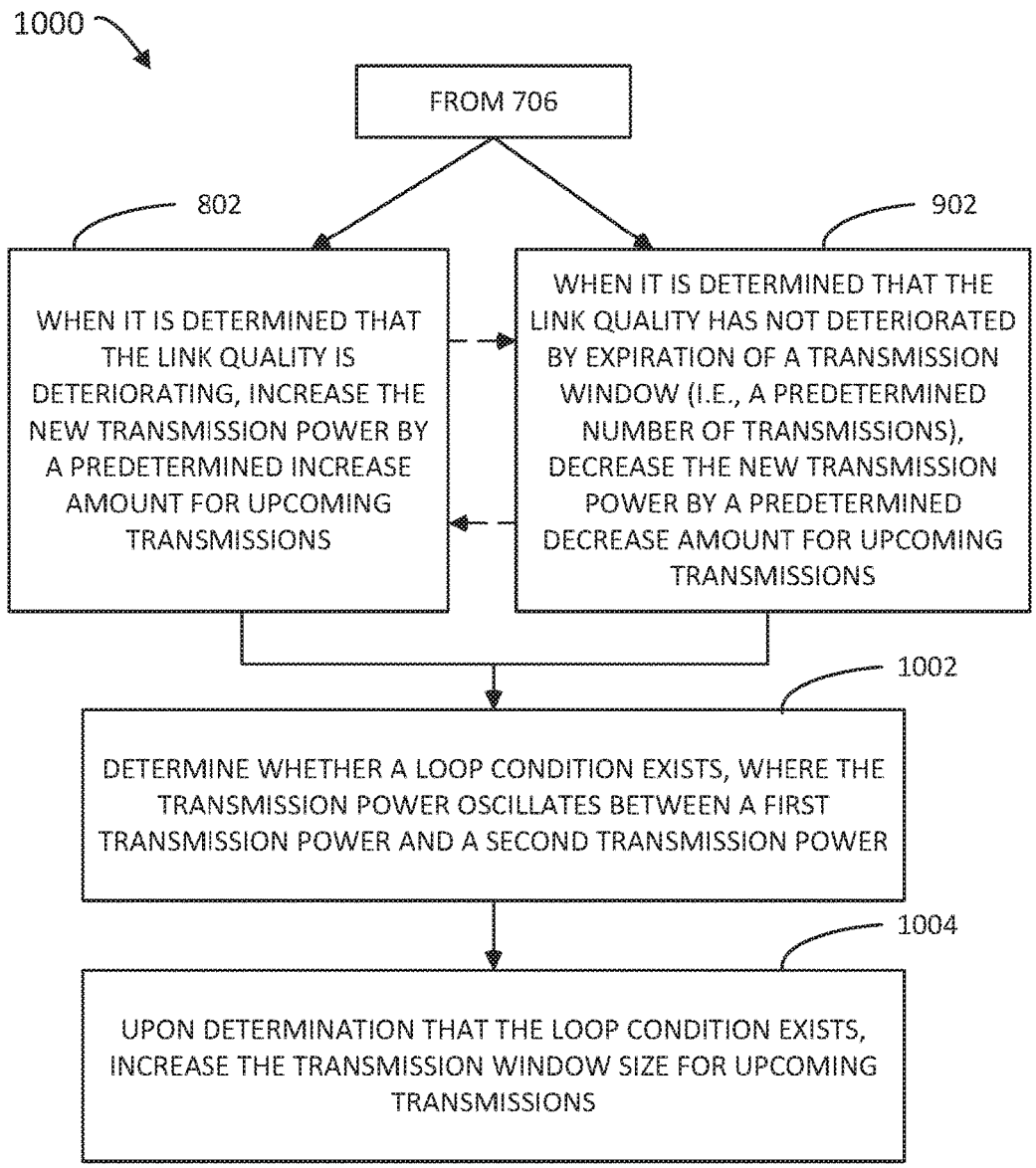

Process 700 of FIG. 7 monitors link quality of the communications between the sending device and the receiving device, according to embodiments of the present disclosure. Process 700 continues from 610 of process 600. At 702, an expected transmission count (ETX) may be obtained or determined (e.g., by ETX/ETT monitor 238) for each additional data transmission transmitted from the transmitting device to the receiving device. At 704, an average ETX may be determined (e.g., by ETX/ETT monitor 238) based on the obtained/determined ETXs. At 706, the average ETX may be monitored (e.g., by ETX/ETT monitor 238) to determine whether link quality is deteriorating (e.g., based on a predetermined threshold, based on a change in average ETX from a previous one or more transmissions, etc.). If the link quality is determined to be deteriorating, the new transmission power may be increased by a predetermined increase amount for upcoming transmissions, per 802 of FIG. 8. If the link quality is determined to be acceptable after the expiration of a transmission window (i.e., a predetermined number of transmissions), the new transmission power may be decreased by a predetermined decrease amount for upcoming transmissions, per 902 of FIG. 9.

As discussed above, the possibility of a loop condition exists, where when link quality is acceptable, the transmission power is decreased (process 900 of FIG. 9), but the decrease in transmission power may cause the link quality to become unacceptable, which will trigger the transmission power to be increased (process 800 of FIG. 8), and so on. Therefore, in an embodiment, this loop condition, where the transmission power is caused to oscillate between a first transmission power and a second transmission power, may be detected (e.g., by loop detector 232). Such a loop condition is shown in process 1000 of FIG. 10. Upon determination that such a loop condition exists (at 1002), the transmission window size (i.e., the predetermined number of transmissions) may be increased for upcoming transmissions (e.g., by BEW estimator 230) (at 1004). Increasing the transmission window size may help prevent, or at least minimize, the occurrence of a loop condition.

Figure 11:
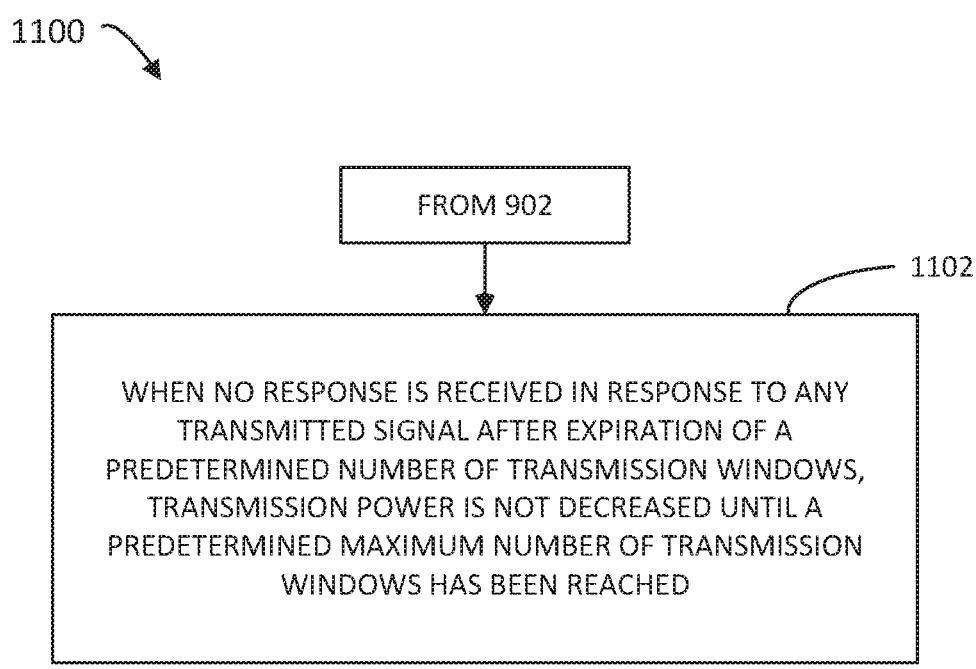

In an embodiment, after transmission power is decreased (process 900 of FIG. 9), if no response is received in response to data transmissions after expiration of a predetermined number of transmission windows (i.e., separate sets of a predetermined number (same or differing, depending on the determined conditions) of transmissions), the transmission power level is not decreased until a predetermined maximum number of transmission windows has been reached, per 1102 (FIG. 11). In this situation, the receiving device may be deemed out of coverage (e.g., by out of coverage detector 234) for a new decreased transmission power, and the transmission power may be set to remain at its previous level (or higher, if warranted) instead of the decreased level for a predetermined number of transmission windows before the transmission power is decreased again.

Figure 12:
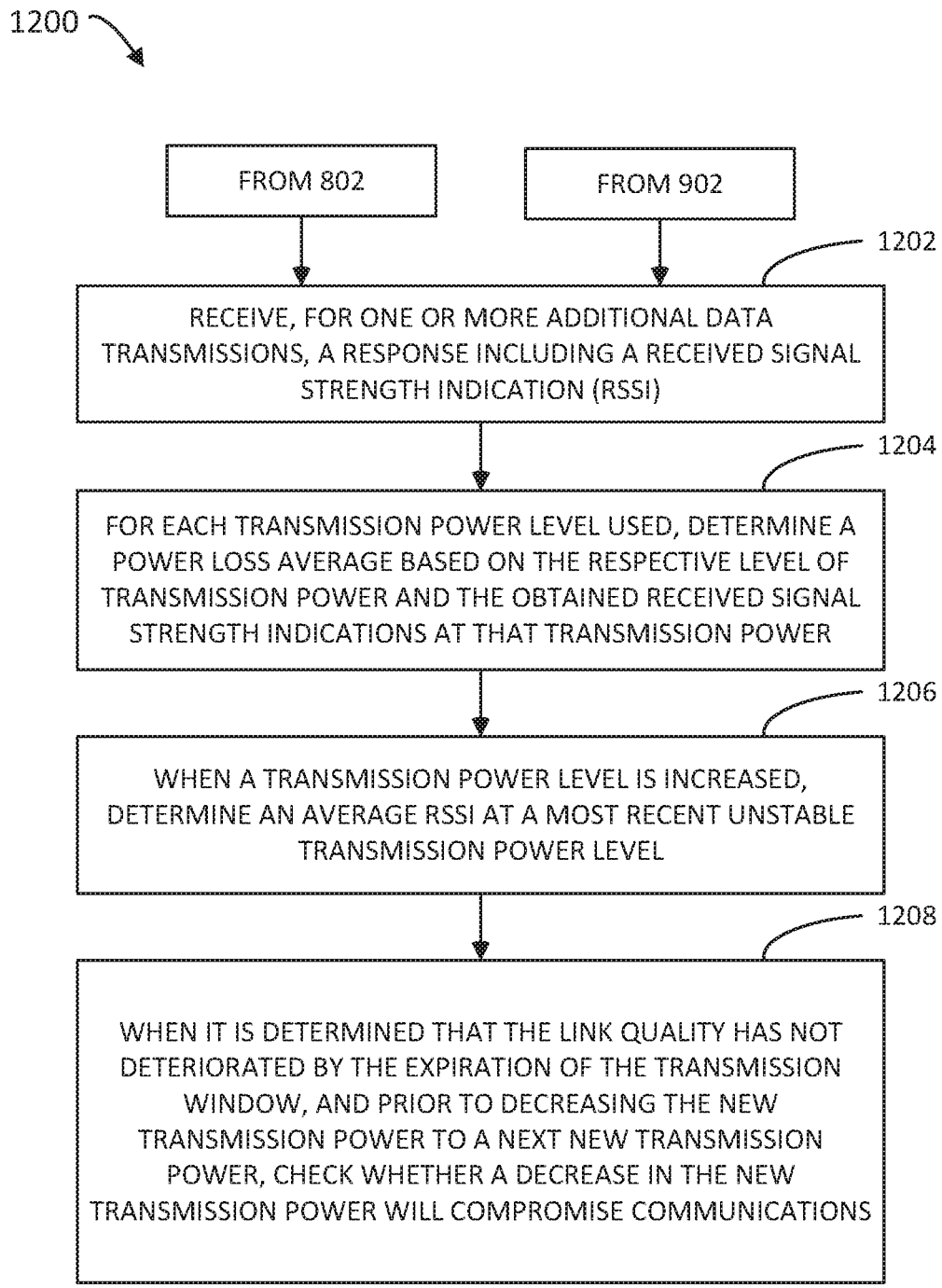
Figure 13:
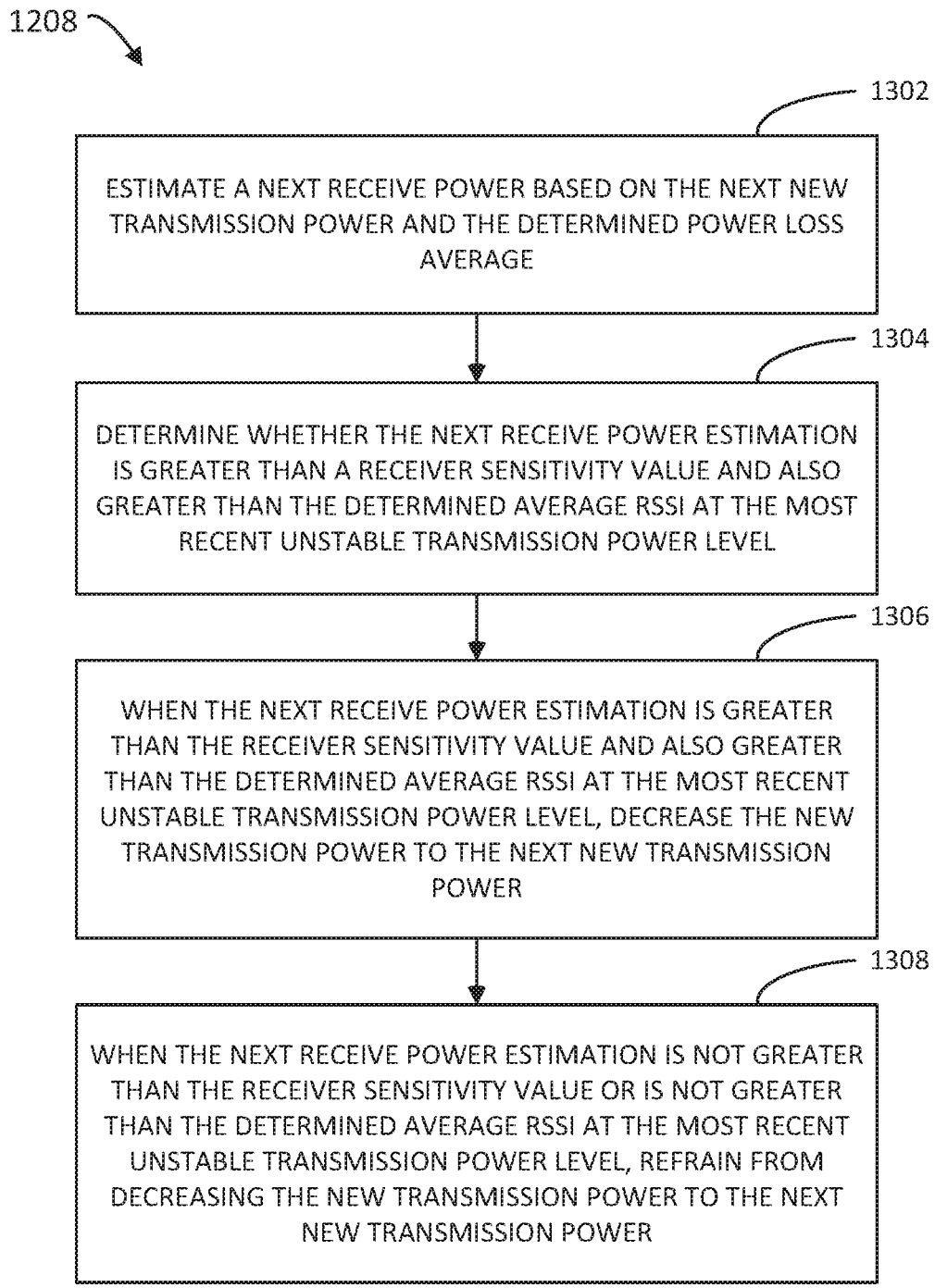

In an embodiment, in order to prevent possible issues described above related to a loop condition (e.g., oscillation between two transmission power levels), an out-of-coverage condition, etc., a further check may be conducted (e.g., by safe-to-decrease monitor 236) prior to decreasing transmission power. FIGS. 12 and 13 describe an example of such a further check. Stemming from 802 and 902 of processes 800 and 900, where transmission power may be increased or decreased based on determined link quality, process 1200 collects further information to conduct a further check in the event that a decreased transmission power is prescribed. At 1202, a response may be received for one or more additional data transmissions, the response including a received signal strength indication (RSSI). At 1204, for each transmission power level used, a power loss average may be determined based on the respective level of transmission power and the obtained received signal strength indications at that transmission power. At 1206, when a transmission power level is increased, an average RSSI may be determined for the most recent unstable transmission power level (e.g., the most recent unstable lower power level). At 1208, when it is determined that link quality has not deteriorated by the expiration of the transmission window, and prior to decreasing the new transmission power to a next new transmission power (e.g., by a predetermined decrease amount), a check may be conducted to determine whether a decrease in the new transmission power will compromise communications.

An example of the check to determine whether a decrease in the new transmission power will affect communications may be found in FIG. 13, according to an embodiment. At 1302, a next receive power may be estimated based on the next new transmission power and the determined power loss average. At 1304, it may be determined whether the next receive power estimation is greater than a receiver sensitivity value (known or predetermined) and also greater than the determined average RSSI (if this value exists or is not NULL) at the most recent unstable transmission power level (e.g., the most recent unstable lower power level). At 1306, if the next receive power estimation is greater than both of these, then the transmission power may be decreased to the next new transmission power. At 1308, if the next receive power estimation is not greater than the receiver sensitivity value or is not greater than the determined average RSSI at the most recent unstable transmission power level, the transmission power is not decreased to the next new transmission power.

Figure 14:
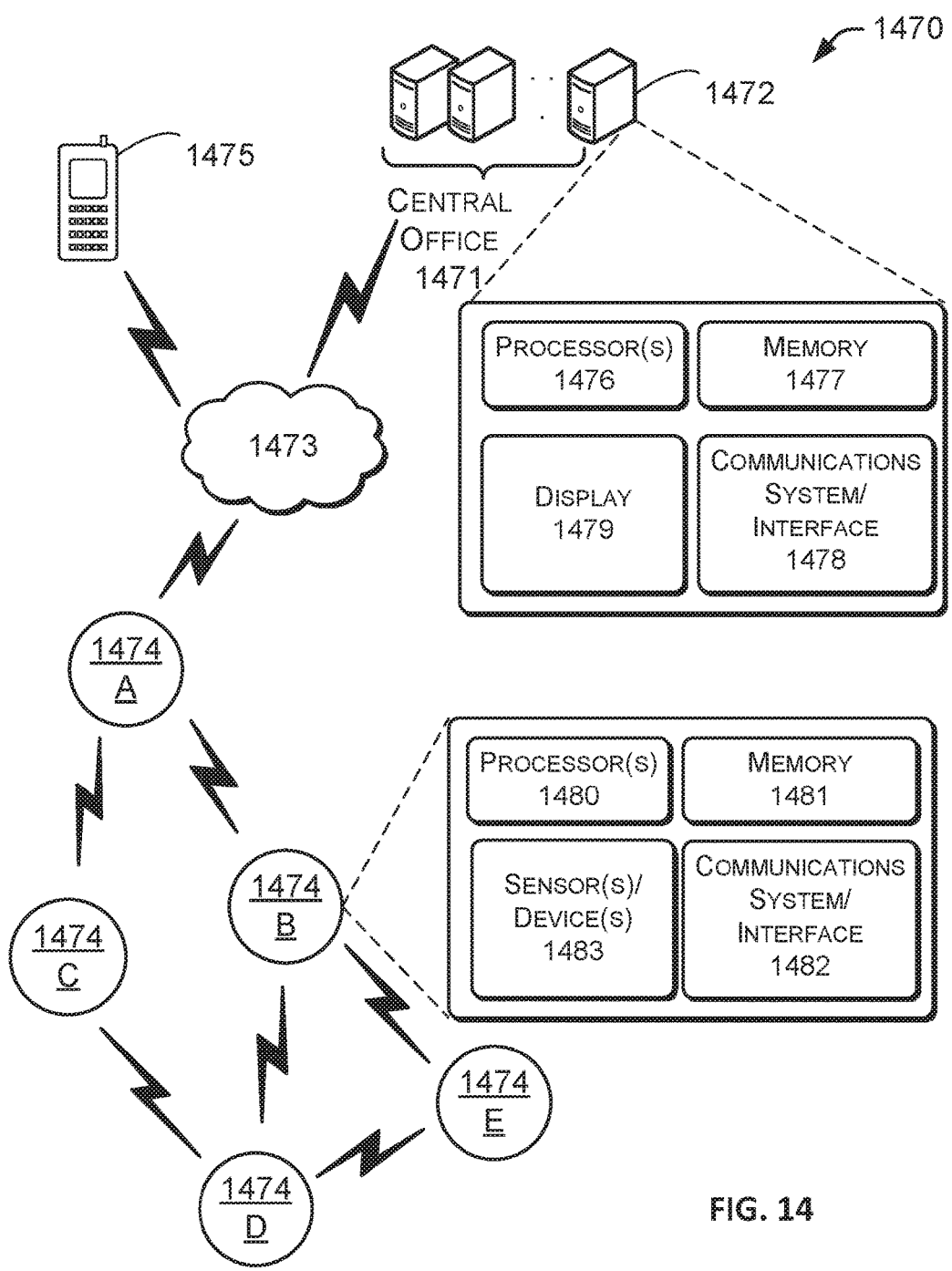
FIG. 14 is an illustration of an example network environment in which example methods, apparatus, and articles of manufacture disclosed herein may be implemented, according to embodiments of the present disclosure.

FIG. 14 is an illustration of an example network environment in which example methods, apparatus, and articles of manufacture disclosed herein may be implemented, according to embodiments of the present disclosure. For example, sending device (or node) 212, 312 and/or receiving device (or node) 214, 314 may be a part of an advanced communication system (e.g., an advanced meter reading (AMR) network or an advanced metering infrastructure (AMI) network, of a utility related application), such as data collection network 1470 of FIG. 7, according to embodiments. Data collection network 1470 may include a central office 1471, which may be associated with a data collection/processing entity (e.g., a utility company, in the case of an AMR or AMI network). The central office may include one or more central computing device(s) 1472 that may communicate with network nodes through one or more networks 1473, which may be the Internet or other network having widespread or local functionality. Network nodes may include nodes 1474A-1474E (collectively, nodes 1474), which may include, for example, endpoint devices such as utility meters or other devices that may comprise sensors, actuators, etc. (e.g., gas meters, water meters, electric meters, etc.). These nodes may be located at various locations (e.g., homes, businesses, etc.). Nodes 1474A-1474E may be configured in a mesh network, star network or other configuration. While only five nodes 1474 are illustrated for simplicity, there may be any number of network nodes. One or more of the network nodes (e.g., device 1474A) may be a data collector and/or concentrator that may be configured for communication (e.g., radio frequency (RF) communication, cellular communication, etc.) with a plurality of downstream nodes 1474B-1474E, which may also be configured for similar communications. In an example operation, data collector 1474A may send and/or receive data or other communications to and/or from nodes 1474B-1474E to be provided to a data collection device 1472, (which may be located at central office 1471) and/or a mobile data collection device 1475. For example, in an AMR or AMI network, data collector 1474A may collect data from nodes 1474B-1474E that may include consumption data or other information associated with a utility meter (e.g., a gas meter, a water meter, an electricity meter, etc.). Additionally, data collector 1474A may send software updates, firmware updates, instructions or other information (which may have been communicated to data collector 1474A from data collection device 1472 or 1475, for example) to one or more of the nodes 1474B-1474E. In an embodiment, one or more network nodes (e.g., nodes 1474A-1474E) may be powered by a battery.

In an expanded view, data collection device 1472 (and/or mobile data collection device 1475) may include, among other components, one or more controllers or processors 1476, a memory 1477, one or more communications systems and/or interfaces 1478 (e.g., configured for RF communications, cellular communications, and/or another type of communications), and optionally a display 1479. Nodes 1474 may include, among other components, one or more controllers or processors 1480, a memory 1481, one or more communications systems and/or interfaces 1482 (e.g., configured for RF communications, cellular communications, and/or another type of communications), and one or more sensors/devices 1483, which may include, for example, one or more measurement sensors or other devices (e.g., meter(s), actuator(s), light(s), etc.).

One or more features disclosed herein may be implemented in hardware, software, firmware, and/or combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as may be used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

A processing platform of a data collection device (e.g., data collection device 1472 or mobile data collection device 1475 of FIG. 14), and/or a node (e.g., any of devices 1474) may be embodied in any type of mobile and/or non-mobile computing device. Examples of mobile devices may include, but are not to be limited to, laptop computers, ultra-laptop computers, tablets, touch pads, portable computers, hand-held computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices (e.g., utility meters or other sensors or devices), etc.

Figure 15:
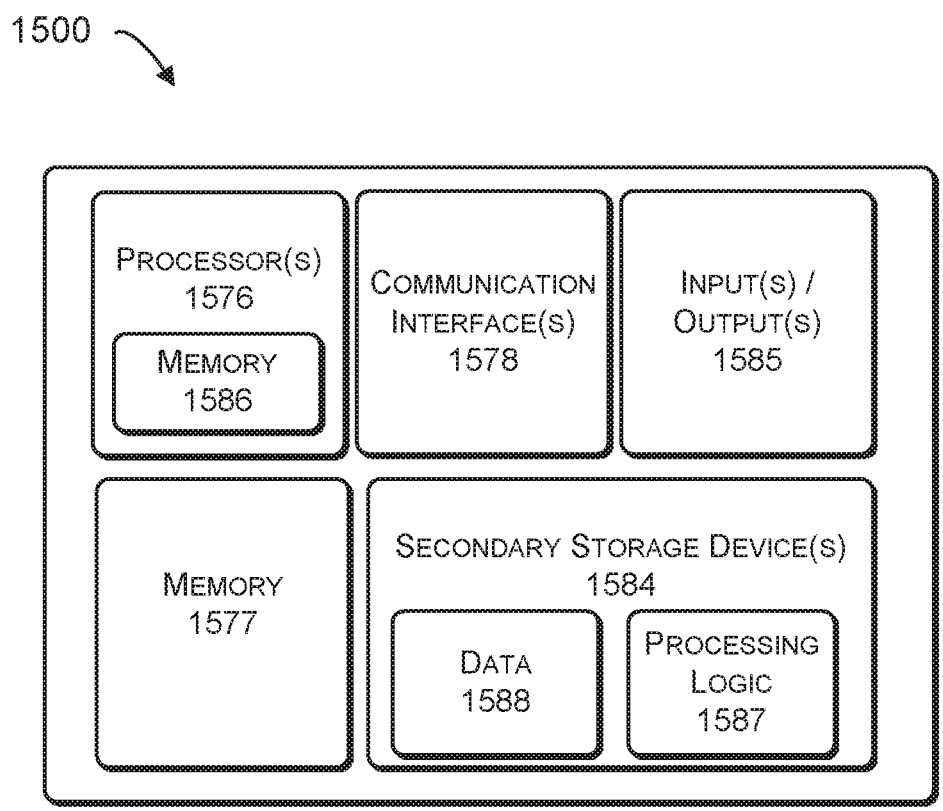
FIG. 15 is a block diagram showing various components of an example data collection device, according to an embodiment of the present disclosure.

FIG. 15 is a block diagram of an example processing platform 1500 of a mobile or non-mobile data collection device (e.g., data collection device 1472, 1475), according to embodiments. Processing platform 1500 may include one or more processors 1576, memory 1577, one or more secondary storage devices 1584, one or more input/output ports or devices 1585, and/or one or more communication interfaces 1578, in communication via a bus, line, or similar implementation (not shown). Processing platform 1500 may also include a power supply (not shown), which may include an interface to an electricity source and/or may include one or more batteries.

Processor(s) 1576 may be implemented by, for example but not limitation, one or more integrated circuits, logic circuits, microprocessors, controllers, etc. Processor(s) 1576 may include a local memory 1586 (e.g., a cache). Memory 1577 may include a volatile and/or a non-volatile memory. Volatile memory may be implemented by, for example but not limitation, Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1577 may be controlled by a memory controller (not shown). Data stored in memory 1577 and/or local memory 1586 may be used by processor(s) 1576 to facilitate data collection functions and/or communications, calculations/computations (e.g., as described herein, if not done at the node device(s)), etc., according to embodiments of this disclosure.

Input/output port(s)/device(s) 1585 may allow a user or an external device to interface with processor(s) 1576. Input devices may allow a user to enter data and/or commands for processor(s) 1576. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices such as display device 1479. Examples of display devices may include a light emitting diode (LED), an organic light emitting diode (OLED), a liquid crystal display, a cathode ray tube display (CRT), a touchscreen, a tactile output device, a printer, speakers, etc. The input/output device(s) 1585 may be connected to processor(s) 1576, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1578 may be implemented in hardware or a combination of hardware and software, and may provide wired or wireless network interface(s) to one or more networks, such as network(s) 1473 of FIG. 14. Communication interface(s) 1478 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1473. In an embodiment, security mechanisms may be used to provide secure communications, as would be understood by one of ordinary skill in the art.

Secondary storage device(s) 1584 may store processing logic 1587 (e.g., software) to be executed by processor(s) 1576, and/or may store data 1588. Processing logic 1587 and data 1588 may be used by processor(s) 1576 to facilitate data collection functions and/or communications between devices, calculations/computations (e.g., if not done at the node device(s)), etc., according to embodiments of this disclosure. Processing logic 1587 may include instructions for executing the methodology described herein for a data collection device, for example. Examples of secondary storage device(s) 1584 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1584.

Figure 16:
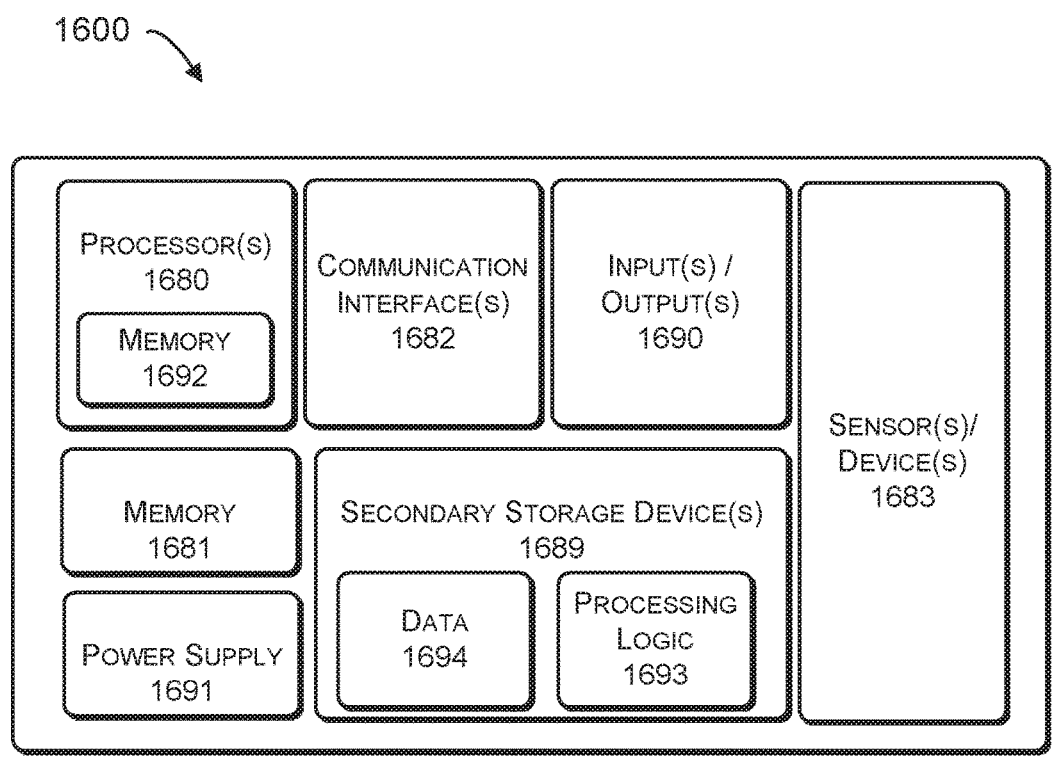
FIG. 16 is a block diagram showing various components of an example network node, according to an embodiment of the present disclosure.

FIG. 16 is a block diagram of an example processing platform 1600 of a node device (e.g., node 212, 312, 214, 314, 1474, etc.), according to embodiments. Processing platform 1600 may include one or more processors 1680, memory 1681, one or more secondary storage devices 1689, one or more input/output ports or devices 1690, and/or one or more communication interfaces 1682, in communication via a bus, line, or similar implementation (not shown). Processing platform 1600 may also include a power supply 1691, which may include an interface to an electricity source and/or may include one or more batteries. Platform 1600 may also include one or more sensors/devices 1683, which may include, for example, one or more measurement sensors or other devices (e.g., meter(s), actuator(s), light(s), etc.).

Processor(s) 1680 may be implemented by, for example but not limitation, one or more integrated circuits, logic circuits, microprocessors, controllers, etc. Processor(s) 1680 may include a local memory 1692 (e.g., a cache). Memory 1681 may include a volatile and/or a non-volatile memory. Volatile memory may be implemented by, for example but not limitation, Synchronous Dynamic Random Access Memory (SDRAM), Dynamic Random Access Memory (DRAM), and/or any other type of random access memory device. Non-volatile memory may be implemented by flash memory and/or any other desired type of memory device. Access to memory 1681 may be controlled by a memory controller (not shown). Data stored in memory 1681 and/or local memory 1692 may be used by processor(s) 1680 to facilitate data collection functions, calculations/computations, metering functions and/or metering calculations/computations if embodied in a utility meter, and/or communications, etc., according to embodiments of this disclosure.

Input/output port(s)/device(s) 1690 may allow a user or an external device to interface with processor(s) 1680. Input devices may allow a user to enter data and/or commands for processor(s) 1680. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output device(s) 1690 may be connected to processor(s) 1680, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1682 may be implemented in hardware or a combination of hardware and software, and may provide wired or wireless network interface(s) to one or more networks, such as network(s) 1473 of FIG. 14. Communication interface(s) 1682 may be a part of, or connected with, the interface circuit discussed above, and/or may include or connect with communication devices such as a transmitter, a receiver, a transceiver, a modem and/or network interface card to facilitate exchange of data with external devices via a network, such as network(s) 1473. In an embodiment, security mechanisms may be used to provide secure communications, as would be understood by one of ordinary skill in the art.

Secondary storage device(s) 1689 may store processing logic 1693 (e.g., software) to be executed by processor(s) 1680, and/or may store data 1694. Processing logic 1693 and data 1694 may be used by processor(s) 1680 to facilitate sensor data collection functions, metering functions and/or metering calculations/computations if embodied in a utility meter, and/or communications between devices, etc., according to embodiments of this disclosure. Processing logic 1693 may include instructions for executing the methodology described herein. Examples of secondary storage device(s) 1689 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1689.

The foregoing description discloses wireless transmission power control techniques that may be used to dynamically optimize use of power for wireless transmissions while avoiding the downsides of the energy-saving approaches currently used. The technology described herein provides efficient use of a battery and improved battery (and network) lifetime while maximally providing nearer node gain, mitigating the near-far problem, and promoting lower interference and higher channel re-use. As described in more detail above, transmission power may be adjusted dynamically to an optimized level with acceptable reliability and can adapt the transmission power level to changes in communication link conditions. In an embodiment, ETX and/or ETT may be used as a primary metric to determine link quality, while an RSSI metric at the receiver side may be obtained with a feedback mechanism and used as an auxiliary metric to safeguard a decision of the system (e.g., of BEW estimator 230) to estimate an optimal transmission window value that is stable and provides a reliable and energy efficient communication. Using link quality information from both the transmission (TX) and receive (RX) sides results in greatly improved link estimations and power control. The techniques, once understood from the disclosure herein, can be easily implemented and do not use static thresholds on signal levels, which provides more versatility to differing environmental conditions (e.g., spatial and temporal factors, including distance, temperature, humidity, pressure, noise, foreign objects, location or terrain (fields, mountains, indoors, etc.), changes over time, etc.). The system is self-learning with dynamic transmission window sizing, and also provides out of coverage detection. Further, a short initial phase is used with close to no overhead as it works on a data/response exchange. In summary, the techniques described herein provide intelligent power control with improved link quality estimation and fast dynamic convergence to optimization. Ease of implementation, little to no overhead, and energy conservation may also result in lower maintenance and lower cost in addition to other described advantages and benefits.

The particular examples used in this document are for ease of understanding and are not to be limiting. Though at times described for use directed to utility metering (e.g., of gas, water, electricity, etc.), features described herein may be used in many other contexts that may or may not involve utility metering (e.g., sensors for IoT applications, WSN networks, etc.). While the techniques described herein may be beneficial for battery operated devices or sensors, it may be applicable to mains line powered devices as well. As would be understood by one of ordinary skill in the art, the energy conservation and cost-saving features discussed herein may be beneficial in many other systems involving wireless communications, including in fields yet unknown.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device configured for communications in a radio frequency, RF, network, the device comprising:
    a transmission power controller;
    a transceiver communicably coupled with the transmission power controller, the transceiver configured to communicate with other devices over the network; and
    a memory communicably coupled with the transmission power controller, the memory storing instructions that, when executed by the transmission power controller, direct the transmission power controller to:
        via the transceiver, transmit, at an initial transmission power, an initial data transmission intended for at least one receiving device on the network;

via the transceiver, receive an initial response from the at least one receiving device, the initial response including an initial received signal strength indication, RSSI;
determine a power loss based on the value of the initial transmission power and the received RSSI;
determine a new transmission power based on the determined power loss;
via the transceiver, transmit, at the new transmission power, one or more additional data transmissions intended for the at least one receiving device;
determine an expected transmission count, ETX, for one or more additional data transmissions;
determine an average ETX based on the determined ETXs; and
monitor the average ETX to determine whether link quality is deteriorating.

2. The device of claim 1, wherein the initial transmission power is a predetermined maximum transmission power.

3. The device of claim 1, wherein the new transmission power is further based on at least one of a power sensitivity factor or a predetermined margin.

4. The device of claim 1, wherein the determining of the average ETX includes determining the average ETX using an exponential weighted mean average.

5. The device of claim 1, wherein the instructions further direct the transmission power controller to:
determine whether the link quality has deteriorated by expiration of a transmission window, wherein the transmission window is a predetermined number of transmissions; and
upon determining that the link quality has not deteriorated by expiration of the transmission window, decrease the new transmission power by a predetermined decrease amount for upcoming transmissions.

6. The device of claim 5, wherein the instructions further direct the transmission power controller to:
via the transceiver, receive, respectively for the one or more additional data transmissions, a response including a received signal strength indication, RSSI;
for each transmission power level used for the one or more additional data transmissions, determine a power loss average based on the respective level of transmission power and the obtained RSSIs at that transmission power;
when a transmission power level is increased, determine an average RSSI at a most recent unstable transmission power level; and
when it is determined that the link quality has not deteriorated by the expiration of the transmission window, and prior to decreasing the new transmission power to a next new transmission power, check whether a decrease in the new transmission power will compromise communications by:
estimating a next receive power based on the next new transmission power and the determined power loss average at the next new transmission power;
determining whether the next receive power estimation is greater than a receiver sensitivity value and also greater than the determined average RSSI at the most recent unstable transmission power level;
when the next receive power estimation is greater than the receiver sensitivity value and also greater than the determined average RSSI at the most recent unstable transmission power level, decreasing the new transmission power to the next new transmission power; and
when the next receive power estimation is not greater than the receiver sensitivity value or is not greater than the determined average RSSI at the most recent unstable transmission power level, refraining from decreasing the new transmission power to the next new transmission power.

7. The device of claim 5, wherein when no response is received in response to a data transmission after expiration of a predetermined number of transmission windows, the device is declared out of coverage for the decreased new transmission power, and the instructions further direct the transmission power controller to:
refrain from decreasing the new transmission power until a predetermined maximum number of transmission windows has been reached.

8. The device of claim 1, wherein the instructions further direct the transmission power controller to:
when it is determined that the link quality is deteriorating, increase the new transmission power by a predetermined increase amount for upcoming transmissions.

9. The device of claim 1, wherein the instructions further direct the transmission power controller to:
when it is determined that the link quality has not deteriorated by expiration of a transmission window, wherein the transmission window is a predetermined number of transmissions, decrease the transmission power by a predetermined decrease amount for upcoming transmissions;
when it is determined that the link quality is deteriorating, increase the new transmission power by a predetermined increase amount for upcoming transmissions;
determine whether a loop condition exists, wherein the loop condition is determined to exist when the transmission power oscillates between a first transmission power and a second transmission power; and
upon determining that the loop condition exists, increase a size of the transmission window for upcoming transmissions.

10. A method of controlling transmission power by a transmission power controller of a network device, the method comprising:
transmitting, via a transceiver, at an initial transmission power, an initial data transmission intended for at least one receiving device on a network;
receiving, via the transceiver, an initial response from the at least one receiving device, the initial response including an initial received signal strength indication, RSSI;
determining a power loss based on the value of the initial transmission power and the received RSSI;
determining a new transmission power based on the determined power loss;
transmitting, at the new transmission power, one or more additional data transmissions intended for the at least one receiving device;
determining an expected transmission count, ETX, for one or more additional data transmissions;
determining an average ETX based on the determined ETXs; and
monitoring the average ETX to determine whether link quality is deteriorating.

11. The method of claim 10, further comprising:
determining whether the link quality has deteriorated by expiration of a predetermined transmission window, wherein the transmission window is a predetermined number of transmissions; and upon determining that the link quality has not deteriorated by expiration of the transmission window, decreasing the new transmission power by a predetermined decrease amount for upcoming transmissions.

12. The method of claim 11, further comprising:
receiving, via the transceiver, for the one or more additional data transmissions, a response including a received signal strength indication, RSSI;
for each transmission power level used for the one or more additional data transmissions, determining a power loss average based on the respective level of transmission power and the obtained RSSIs at that transmission power;
when a transmission power level is increased, determining an average RSSI at a most recent unstable transmission power level; and
when it is determined that the link quality has not deteriorated by the expiration of the transmission window, and prior to decreasing the new transmission power to a next new transmission power, checking whether a decrease in the new transmission power will compromise communications by:
  estimating a next receive power based on the next new transmission power and the determined power loss average at the next new transmission power;
  determining whether the next receive power estimation is greater than a receiver sensitivity value and also greater than the determined average RSSI at the most recent unstable transmission power level;
  when the next receive power estimation is greater than the receiver sensitivity value and also greater than the determined average RSSI at the most recent unstable transmission power level, decreasing the new transmission power to the next new transmission power; and
  when the next receive power estimation is not greater than the receiver sensitivity value or is not greater than the determined average RSSI at the most recent unstable transmission power level, refraining from decreasing the new transmission power to the next new transmission power.

13. The method of claim 11, further comprising:
when no response is received in response to a data transmission after expiration of a predetermined number of transmission windows, refraining from decreasing the new transmission power until a predetermined maximum number of transmission windows has been reached.

14. The method of claim 10, further comprising:
when it is determined that the link quality has not deteriorated by expiration of a predetermined transmission window, wherein the transmission window is a predetermined number of transmissions, decreasing the new transmission power by a predetermined decrease amount for upcoming transmissions;
when it is determined that the link quality is deteriorating, increasing the new transmission power by a predetermined increase amount for upcoming transmissions;
determining whether a loop condition exists, wherein the loop condition is determined to exist when the transmission power oscillates between a first transmission power and a second transmission power; and
upon determining that the loop condition exists, increasing a size of the transmission window for upcoming transmissions.

15. At least one non-transitory computer-readable medium having computer program logic stored thereon, the computer program logic including instructions that, when executed by a processor, cause the processor to:
transmit, via a transceiver communicably coupled with the processor, and at an initial transmission power, an initial data transmission intended for at least one receiving device on a network;
receive, via the transceiver, an initial response from the at least one receiving device, the initial response including an initial received signal strength indication, RSSI;
determine a power loss based on the value of the initial transmission power and the received RSSI;
determine a new transmission power based on the determined power loss;
transmit, at the new transmission power, one or more additional data transmissions intended for the at least one receiving device;
determine an expected transmission count, ETX, for one or more additional data transmissions;
determine an average ETX based on the determined ETXs; and
monitor the average ETX to determine whether link quality is deteriorating.

16. The at least one non-transitory computer-readable medium of claim 15, wherein the instructions, when executed, further cause the processor to:
determine whether the link quality has deteriorated by expiration of a predetermined transmission window, wherein the transmission window is a predetermined number of transmissions; and
upon determining that the link quality has not deteriorated by expiration of the transmission window, decrease the new transmission power by a predetermined decrease amount for upcoming transmissions.

17. The at least one non-transitory computer-readable medium of claim 16, wherein the instructions, when executed, further cause the processor to:
receive, via the transceiver, and for the one or more additional data transmissions, a response including a received signal strength indication, RSSI;
for each transmission power level used for the one or more additional data transmissions, determine a power loss average based on the respective level of transmission power and the obtained RSSIs at that transmission power;
when a transmission power level is increased, determine an average RSSI at a most recent unstable transmission power level; and
when it is determined that the link quality has not deteriorated by the expiration of the transmission window, and prior to decreasing the new transmission power to a next new transmission power, check whether a decrease in the new transmission power will compromise communications by:
  estimating a next receive power based on the next new transmission power and the determined power loss average at the next new transmission power;
  determining whether the next receive power estimation is greater than a receiver sensitivity value and also greater than the determined average RSSI at the most recent unstable transmission power level;
  when the next receive power estimation is greater than the receiver sensitivity value and also greater than the determined average RSSI at the most recent unstable transmission power level, decreasing the new transmission power to the next new transmission power; and when the next receive power estimation is not greater than the receiver sensitivity value or is not greater than the determined average RSSI at the most recent unstable transmission power level, refraining from decreasing the new transmission power to the next new transmission power.

18. The at least one non-transitory computer-readable medium of claim 16, wherein the instructions, when executed, further cause the processor to:
when no response is received in response to a data transmission after expiration of a predetermined number of transmission windows, refrain from decreasing the new transmission power until a predetermined maximum number of transmission windows has been reached.

19. The at least one non-transitory computer-readable medium of claim 15, wherein the instructions, when executed, further cause the processor to:

when it is determined that the link quality has not deteriorated by expiration of a transmission window, wherein the transmission window is a predetermined number of transmissions, decrease the new transmission power by a predetermined decrease amount for upcoming transmissions;

when it is determined that the link quality is deteriorating, increase the new transmission power by a predetermined increase amount for upcoming transmissions;

determine whether a loop condition exists, wherein the loop condition is determined to exist when the transmission power oscillates between a first transmission power and a second transmission power; and upon determining that the loop condition exists, increase a size of the transmission window for upcoming transmissions.

* * * * *